US007565391B2

(12) United States Patent
Hu

(10) Patent No.: US 7,565,391 B2
(45) Date of Patent: Jul. 21, 2009

(54) BINARY DIGIT MULTIPLICATIONS AND APPLICATIONS

(75) Inventor: Te Chiang Hu, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 783 days.

(21) Appl. No.: 11/016,544

(22) Filed: Dec. 17, 2004

(65) Prior Publication Data

US 2006/0136541 A1 Jun. 22, 2006

(51) Int. Cl.
*G06F 7/52* (2006.01)

(52) U.S. Cl. ........................ 708/625; 708/607; 708/620

(58) Field of Classification Search ......... 708/620–626, 708/607

See application file for complete search history.

(56) References Cited

U.S. PATENT DOCUMENTS 4,566,075 A 1/1986 Guttag
5,136,537 A * 8/1992 Asghar et al. ............... 708/620
5,146,421 A * 9/1992 Adiletta et al. .............. 708/626
5,465,226 A * 11/1995 Goto .......................... 708/625
6,434,586 B1 * 8/2002 Carlson et al. .............. 708/625
6,490,608 B1 12/2002 Zhu
7,139,788 B2 * 11/2006 Talwar et al. ............... 708/626

OTHER PUBLICATIONS

T.H. Cormen, C.E. Leiscrson, R.L. Rivest, and C. Stein, "Introduction to Algorithms," 2nd Edition, MIT Press, 2001, (pp. 881-884).
International Preliminary Report on Patentability for PCT/US2004/042782, international filing date Dec. 17, 2004, mailed on Jul. 20, 2006 (8 pages).

* cited by examiner

*Primary Examiner*—Lewis A Bullock, Jr.
*Assistant Examiner*—Michael Yaary
(74) *Attorney, Agent, or Firm*—Fish & Richardson P.C.

(57) ABSTRACT

A multiplying system for binary digits. The digits are multiplied in a rectangular memory array, where the digits are placed along the edges, and intersections between 1's form blocks of 1's in the memory array. The blocks of 1's are evaluated based on a weighting assigned to positions within the memory, either directly, or by reducing each block to a reduced block representation. The system can be used for multiplications, partial multiplications, and divisions, as well as applications thereof.

48 Claims, 13 Drawing Sheets

|   |   | COORDINATES 500 502 |   |   |   |   |   |   |   |   |   |
|---|---|---|---|---|---|---|---|---|---|---|---|
| $y_0 = 0$ R11 |   |   | 11,3 |   |   | 11,6 |   |   |   |   | 11,11 |
| $y_1 = 1$ R10 |   | 1 |   | 1 | 1 |   |   | 1 | 1 | 1 |   |
| $y_2 = 1$ R9 |   | 1 |   | 1 | 1 |   |   | 1 | 1 | 1 |   |
| $y_3 = 1$ R8 |   | 1 |   | 1 | 1 |   |   | 1 | 1 | 1 |   |
| $y_4 = 1$ R7 |   | 1 |   | 1 | 1 |   |   | 1 | 1 | 1 |   |
| $y_5 = 0$ R6 | 6,1 |   | 6,3 504 |   |   | 6,7 |   |   |   |   |   |
| $y_6 = 0$ R5 |   |   | 5,3 |   |   | 5,6 |   |   |   |   | 5,11 |
| $y_7 = 1$ R4 |   | 1 |   | 1 | 1 |   |   | 1 | 1 | 1 |   |
| $y_8 = 1$ R3 |   | 1 |   | 1 | 1 |   |   | 1 | 1 | 1 |   |
| $y_9 = 0$ R2 | 2,1 |   | 2,3 |   |   | 2,7 |   |   |   |   |   |
| $y_{10} = 0$ R1 |   |   |   |   |   |   |   |   |   |   |   |
|   | C1 | C2 | C3 | C4 | C5 | C6 | C7 | C8 | C9 | C10 | C11 |
|   | 0 | 1 | 0 | 1 | 1 | 0 | 0 | 1 | 1 | 1 | 0 |
|   | $x_{10}$ | $x_9$ | $x_8$ | $x_7$ | $x_6$ | $x_5$ | $x_4$ | $x_3$ | $x_2$ | $x_1$ | $x_0$ |

| | $x_{11}$ | $x_{10}$ | $x_9$ | $x_8$ | $x_7$ | $x_6$ | $x_5$ | $x_4$ | $x_3$ | $x_2$ | $x_1$ | $x_0$ |
|---|---|---|---|---|---|---|---|---|---|---|---|---|
| | 0 | 1 | 1 | 0 | 1 | 1 | 1 | 1 | 0 | 0 | 0 | 1 |
| 1 $y_0$ | | 1 | 1 | | 1 | 1 | 1 | 1 | | | | 1 |
| 1 $y_1$ | | 1 | 1 | | 1 | 1 | 1 | 1 | | | | 1 |
| 1 $y_2$ | | 1 | 1 | | 1 | 1 | 1 | 1 | | | | 1 |
| 0 $y_3$ | | | | | | | | | | | | |
| 0 $y_4$ | | | | | | | | | | | | |
| 1 $y_5$ | | 1 | 1 | | 1 | 1 | 1 | 1 | | | | 1 |
| 1 $y_6$ | | 1 | 1 | | 1 | 1 | 1 | 1 | | | | 1 |
| 1 $y_7$ | | 1 | 1 | | 1 | 1 | 1 | 1 | | | | 1 |
| 0 $y_8$ | | | | | | | | | | | | |
| 1 $y_9$ | | 1 | 1 | | 1 | 1 | 1 | 1 | | | | 1 |
| 1 $y_{10}$ | | 1 | 1 | | 1 | 1 | 1 | 1 | | | | 1 |
| 0 $y_{11}$ | | | | | | | | | | | | |

Regions labeled: 600, 602, 604, 606

| | | | | | | | | | | | |
|---|---|---|---|---|---|---|---|---|---|---|---|
| -1 | | 1 | -1 | | | | 1 | | | | -1 |
| | | | | | | | | | | | |
| | | | | | | | | | | | |
| 1 | | -1 | 1 | | | | -1 | | | | 1 |
| | | | | | | | | | | | |
| -1 | | 1 | -1 | | | | 1 | | | | -1 |
| | | | | | | | | | | | |
| | | | | | | | | | | | |
| 1 | | -1 | 1 | | | | -1 | | | | 1 |
| -1 | | 1 | -1 | | | | 1 | | | | -1 |
| | | | | | | | | | | | |
| 1 | | -1 | 1 | | | | -1 | | | | 1 |

*FIG. 7*

| | | | | | | | | | | | |
|---|---|---|---|---|---|---|---|---|---|---|---|
| $-2^{11}$ | | $2^{9}$ | $-2^{8}$ | | | | $2^{4}$ | | | | $-2^{0}$ |
| | | | | | | | | | | | |
| | | | | | | | | | | | |
| $2^{14}$ | | $-2^{12}$ | $2^{11}$ | | | | $-2^{7}$ | | | | $2^{3}$ |
| | | | | | | | | | | | |
| $-2^{16}$ | | $2^{14}$ | $-2^{13}$ | | | | $2^{9}$ | | | | $-2^{5}$ |
| | | | | | | | | | | | |
| | | | | | | | | | | | |
| $2^{19}$ | | $-2^{17}$ | $2^{16}$ | | | | $-2^{12}$ | | | | $2^{8}$ |
| $-2^{20}$ | | $2^{18}$ | $-2^{17}$ | | | | $2^{13}$ | | | | $-2^{9}$ |
| | | | | | | | | | | | |
| $2^{22}$ | | $-2^{20}$ | $2^{19}$ | | | | $-2^{15}$ | | | | $2^{10}$ |

FIG. 8

NW BLOCK

NE BLOCK

SW BLOCK

SE BLOCK

| | | | | | |
|---|---|---|---|---|---|
| $2^5$ | $2^4$ | | | | $2^0$ |
| $2^6$ | $2^5$ | | | | $2^1$ |
| $2^7$ | $2^6$ | | | | $2^2$ |
| | | | | | |
| | | | | | |
| $2^{10}$ | $2^9$ | | | | $2^5$ |

PRODUCT VALUE OF NE BLOCK

FIG. 10A

NE BLOCK

| | | | | | | |
|---|---|---|---|---|---|---|
| $y_0$ | 1 | 1 | | | | 1 |
| $y_1$ | 1 | 1 | | | | 1 |
| $y_2$ | 1 | 1 | | | | 1 |
| $y_3$ | | | | | | |
| $y_4$ | | | | | | |
| $y_5$ | 1 | 1 | | | | 1 |
| | $x_5$ | $x_4$ | $x_3$ | $x_2$ | $x_1$ | $x_0$ |

FIG. 10B

NE BLOCK

|   | 1 | 1 |   |   |   | 1 |
|---|---|---|---|---|---|---|
|   | 1 | 1 |   |   |   | 1 |
|   | 1 | 1 |   |   |   | 1 |
|   |   |   |   |   |   |   |
|   |   |   |   |   |   |   |
|   | 1 | 1 |   |   |   | 1 |
|   |   |   |   |   |   |   |

| -1 |   | 1  |   |   |   | -1 |
|----|---|----|---|---|---|----|
|    |   |    |   |   |   |    |
|    |   |    |   |   |   |    |
| 1  |   | -1 |   |   |   | 1  |
|    |   |    |   |   |   |    |
| 1  |   | -1 |   |   |   | 1  |
|    |   |    |   |   |   |    |

Positions of bite being received

| ↓TIME | $y_{11}$ | $y_{10}$ | $y_9$ | $y_8$ | $y_7$ | $y_6$ | $y_5$ | $y_4$ | $y_3$ | $y_2$ | $y_1$ | $y_0$ |
|---|---|---|---|---|---|---|---|---|---|---|---|---|
| 1 | 0 | 1 | 1 | | | | | | | | | |
| 2 | | | 1 | 0 | 1 | | | | | | | |
| 3 | | | | | 1 | 0 | 1 | | | | | |
| 4 | | | | | | | 1 | 0 | 0 | | | |
| 5 | | | | | | | | | 0 | 1 | 1 | |
| 6 | | | | | | | | | | | 1 | 1 |
| | 0 | 1 | 1 | 0 | 1 | 0 | 1 | 0 | 0 | 1 | 1 | 1 |

$$Y = \sum_{j=0}^{n-1} y_j 2^j = \text{MULTIPLIER}$$

$$P = \text{PRODUCT VALUE } \sum P_k w_k$$

$$X = \sum_{i=0}^{n-1} x_i 2^i = \text{MULTIPLICAND}$$

BINARY DIGIT MULTIPLICATIONS AND APPLICATIONS

BACKGROUND

Computer implemented multipliers are crucial in modern computer systems. Many different applications, including, but not limited to, linear programming, digit multiplication, vector graphics and others, use computer implemented multipliers.

One conventional way of doing multiplication in computers has been based on the conventional, paper-and-pencil technique known as repeated addition. Consider the example of $(27)_{10}*(27)_{10}=(729)_{10}$.

FIG. 1 illustrates how this may be done by a computer. First the computer takes the binary version of $27=11011_2$. Then, the second $11011_2$ is added to the first version. For the each of the five digits of the second $11011_2$, a row is formed; row 100 is for the lowest significance digit, and row 102 is for the next highest significance digit. The third highest significance digit, for row 104, is a 0, thereby forming a row of zeros. Similarly, rows 106 and 108 are formed.

All of the rows are added together to form the final value $1011011001_2=729_{10}$.

Note that when digits are multiplied in this way, $2n^2$ units of memory storage are required. In addition, there are nine columns to be added, and hence the total addition may include as many as eight carry bits.

The above describes one technique of multiplication on a computer, and it should be understood that there are other such techniques. While the above describes that the amount of storage that is needed grows quadratically with the number of bits, other techniques may scale more or less than this.

In addition, various ways have been used to improve the speed of operation of such a system, and also to minimize the amount of memory storage needed to multiply in this way. Computer hardware and software may operate using bit-shift, look ahead, parallel read, pipeline, table lookup, and other techniques. Booth encoding, 2's compliment representation of signed binary numbers, the composition or partitioning of the number into parts, binary trees, and other similar techniques to improve and increase the speed of this multiplication and to reduce the complexity of the multiplication process.

SUMMARY

A new technique of multiplying, which determines information related to blocks of the 1's in the numbers being multiplied, is disclosed.

Embodiments describe finding blocks of ones in a multiplied result, and evaluating the blocks individually.

Another embodiment represents the blocks of 1's by reduced symbols. Another embodiment describes calculating the value of the block from most significant bits first, and lesser significance bits after the more significant bits.

In an embodiment, two numbers to be multiplied are input into a computing device. The sequences of consecutive same value bits are identified. Blocks of 1's are identified, and the partial contribution from these blocks of 1's are calculated. The partial contributions are accumulated until the ends of the block is reached.

One aspect attempts to ignore locations where the 0s are multiplied in recognition of $0*(0 \text{ or } 1)=0$.

BRIEF DESCRIPTION OF THE DRAWINGS

These and other aspects will now be described in detail with reference to the accompanying drawings, wherein:

FIGS. 7 and 8 illustrate how this divided multiplication can be represented as a reduced multiplication.

FIGS. 10*a* and 10*b* show the weighting of these blocks.

DETAILED DESCRIPTION

Figure 1:
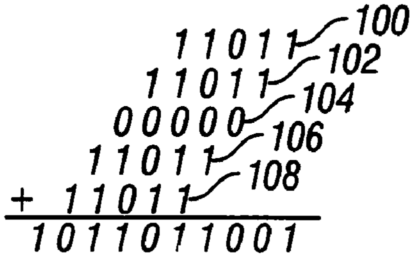
FIG. 1 illustrates a prior art method of multiplying.
Figure 2A:
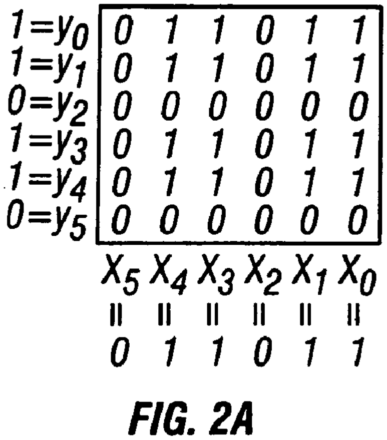
FIG. 2*a* illustrates a zero-one memory table which may be weighted according to a technique of multiplication.
Figure 2B:
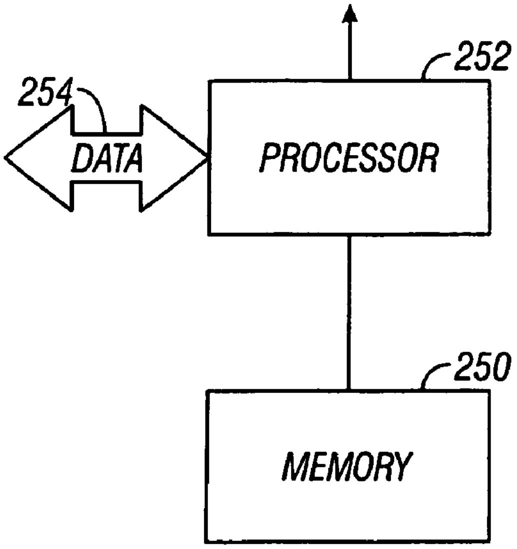
FIG. 2*b* illustrates hardware which may be used according to this system.

A two-dimensional multiplication system is described as a first embodiment with reference to FIGS. 2A and 2B. FIG. 2A shows an example of a zero-one memory table which may be used for the calculation of the values. This memory table may be formed in a memory 250 within the structure of FIG. 2B. Processor 252 receives input which may include data, on bus 254. The results may also be output on bus 254. The embodiment of FIG. 2B may be used as part of any of the other embodiments described throughout this application. This system may be used in any computing system, including an optical computer.

This multiplication system is illustrated as a rectangular array. While the embodiments show a square array, it should be understood that in general a rectangular array may be used, or a multiple dimensional array.

FIG. 2A shows the array being used to multiply 011011 by 011011. Values along the horizontal axis are referred to as X values, as conventional for the horizontal axis. The value X refers to a complete sequence of bits, with $x_n$ referring to the individual bits, of bit value n. In the embodiment, the value of $x_0$ represents the value of the least significant bit of x. Analogously, values along the vertical axis are referred to using Y values, with $y_0$-$y_5$ respectively representing least significant to most significant bits. A leading (most significant) 0 may be used during the multiplication as shown. In the embodiment, each area of intersection between individual bits, is weighted according to the multiplication value of those individual bits.

FIG. 2A illustrates how "0" bits value cause an entire row or an entire column to correspondingly become 0. For example, $Y_2=0$ renders the bits in the third row all equal to 0. The patterns of 0's and 1's forms rectangular blocks of "1" bits.

Figure 3:
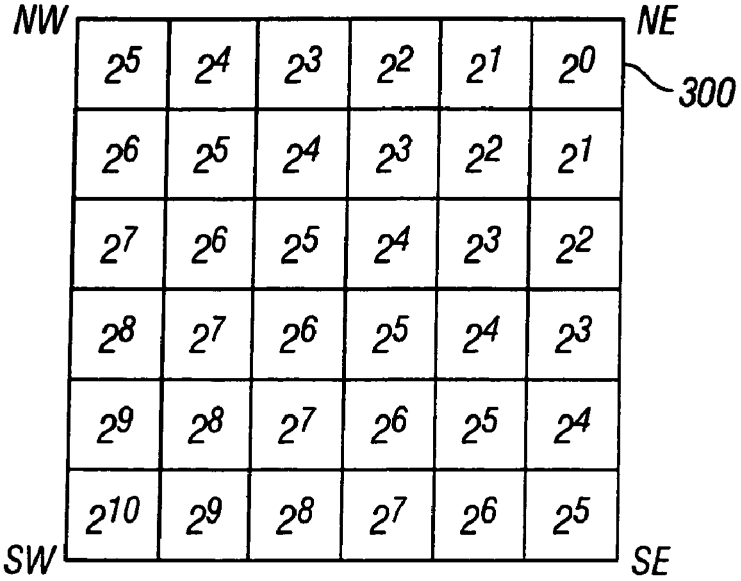
FIG. 3 illustrates the weighting of the table in FIG. 2A.

Multiplying in this way, where areas of intersections between 1's in the binary values area accumulated and evaluated, requires special weighting for the positions of the array. The values of the weighting are illustrated in FIG. 3. Each position in the array is weighted according to the weighting factor $2^i$, where $2^i$=0 is the northeast corner of the square array (bit position 300), and i linearly increases along each linear direction of the array.

The bit in the upper right hand corner is weighted by $2^0$, and the bit in the lower left corner in FIG. 3 is weighted by $2^{10}$. In any column or row, the values of the bits increase linearly from right to left and from top to bottom. Each bit along any left-to-right, top-to-bottom diagonal is weighted the same as shown in FIG. 3. FIG. 3 also shows the convention used to describe the positions, where the upper right corner is called the "northeast" or NE corner or direction; top left is NW, bottom left is SW, and bottom right is SE.

Using this weighting system, if each "1" bit in FIG. 2 is multiplied by the corresponding weighting factor in FIG. 3, then:

TABLE 1

$$\left.\begin{array}{c} 2^4+2^3+0+2^1+2^0+ \\ 2^5+2^4+0+2^2+2^1+ \\ 0+0+0+0+0+ \\ 2^7+2^6+0+2^4+2^3+ \\ 2^8+2^7+0+2^5+2^4 \end{array}\right\} = (729)_{10}$$

demonstrating that this weighting is correct.

In this table format, the product of any two numbers with 0s in the multiplier will correspond to a row of 0s. The product of any two numbers with 0s in the multiplicand will correspond to a column of 0s in the product.

The FIG. 2A technique can be used to multiply binary numbers. Important features of this system include that the more significant bits can be calculated prior to the least significant bits, facilitating an initial analysis or estimate. Also, different parts or blocks of the multiplication can be separately handled.

Second Embodiment

Figure 4A:
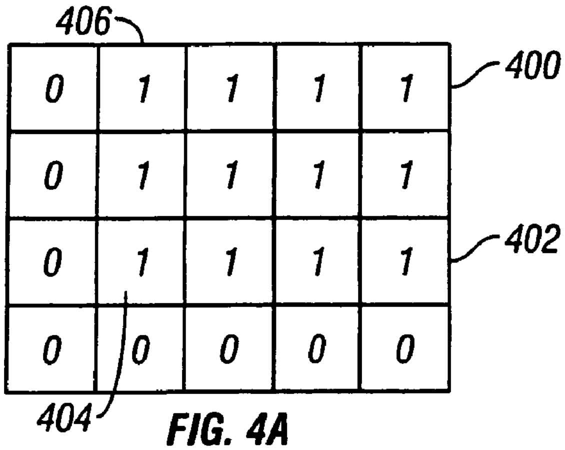
FIGS. 4*a* and 4*b* show how a block of ones can be represented by a reduced symbol representation.
Figure 4B:
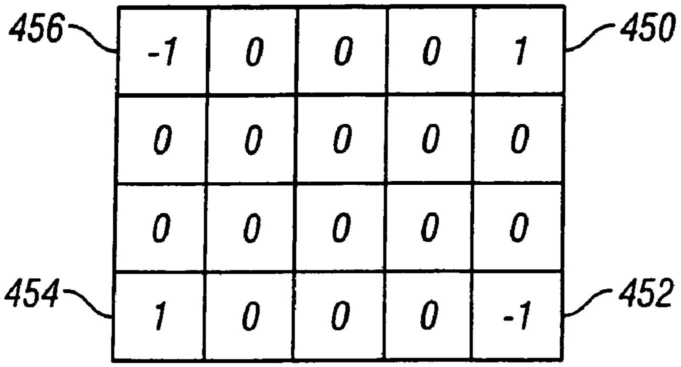

Another embodiment uses a special position encoding system to simplify each block of 1's of any size to four or fewer symbols within the array. A block of 1's such as shown in FIG. 4A is positionally encoded into four symbols representing that block of is, as shown in FIG. 4B. This is referred to herein as a 4 symbol, or "4S," representation.

The rules encoding the block of bits with value "1" into a four symbol or "4S" block as in FIG. 4B are as follows. The northeast bit of the block of 1's is shown as 400 in FIG. 4A. This remains in the same position in the 4S encoded block of FIG. 4B, shown as bit 450 in FIG. 4B. The Southeast bit 402 is positionally encoded one bit south of the bit position 402, and changed to a (−1) shown as 452 in FIG. 4B. The Southwest bit 404 is positionally encoded into a corresponding 1 bit at position 454, shifted diagonally one bit down and to the left. Finally, the Northwest bit 406 is positionally encoded as (−1) bit 456, which is shifted one bit to the left.

More generally, for any block of 1's with m rows and n and columns, the corresponding weighting factors for the 4S representation are:

$2^{m+n}-2^m-2^n+2^0$. This rule of converting from a block of 1's, to the 4S representation, can be computer implemented.

FIG. 4A has the following bit positions, shown in table 2.

TABLE 2

$$\left.\begin{array}{c} 2^3+2^2+2^1+2^0+ \\ 2^4+2^3+2^2+2^1+ \\ 2^5+2^4+2^3+2^2 \end{array}\right\} = (105)_{10}$$

FIG. 4B has the positions shown in table 3.

TABLE 3

$$\left.\begin{array}{cc} -2^4 & +2^0 \\ +2^7 & -2^3 \end{array}\right\} = (105)_{10}$$

A special or degenerate case occurs when either m and/or n is equal to one. For m equals one, only two symbols are used, with a+1 weighted by $2^n$ and a −1 by $2^0$=1. For n=1, again only two symbols are used: a +1 weighted by $2^m$ and a −1 weighted by $2^0$ (=1).

One way of handling the numbers is to add up the negative factors, and then subtract those negative factors from the summation of positive factors. This reduces the problem of multiplication to a problem of subtraction between two numbers.

More generally, independent of the size of any block of 1's, a 4S representation allows this block to be represented as four symbols or two symbols (or 1 symbol for 1 bit) to represent its value. Note also that all of these values are powers of 2, and are relatively easy to add and subtract.

Third Embodiment

Figure 5:
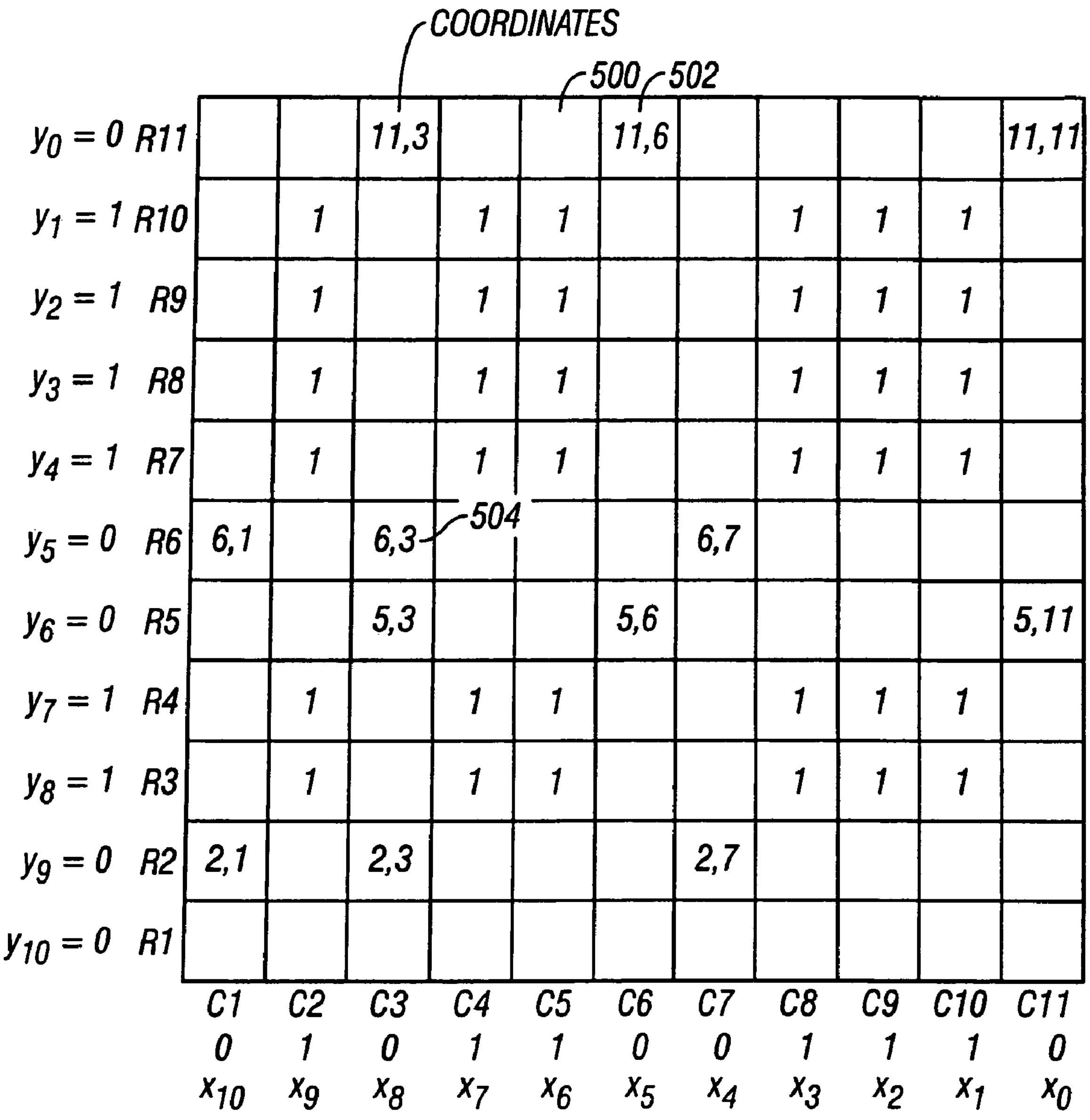
FIG. 5 illustrates another way in which a block of 1's can be illustrated by a reduced representation.

An alternative simplification to the FIG. 4S simplification of FIGS. 4A/4B is shown in FIG. 5. FIG. 5 simplifies each block of is into 2 coordinates defining the two edges of the blocks of 1's. For example, the block 500 of is can be simplified according to its two coordinates, (11, 6) representing the edge 502, and (6,3) representing the edge 504. These two values unambiguously define the corners of the blocks of 1s. Moreover, these two sets of coordinates can be used according to the rule above, to define the 4S symbols 450-456 that can be used to evaluate the value of the block. For example, the coordinates 11,6 and 6,3 can be similarly translated into the four symbols 450-456 in FIG. 4B.

These coordinates shown in FIG. 5 can be obtained directly from reading the two input sequences of multiplier and multiplicand. The multiplier and multiplicand are evaluated to find the leading zero and ending zero of each run of consecutive 0s. For example, FIG. 5 has a sequences of 0s as R1 R2; R5 R6 in the multiplier and C1, C3, C6, C7 in the multiplicand. The coordinates of the cells can be determined from these values.

Another embodiment describes ordering all blocks of 1s from highest significance to lowest significance and calculating the block values as soon as the parts are read that are responsible for the formation of the block. For example, the most significant bits of the multiplier and multiplicant can be read first. This allows obtaining the most significant bit of the final product value before reading or evaluating less significant digits of the multiplier and multiplicant.

Fourth Embodiment

Figure 6A:
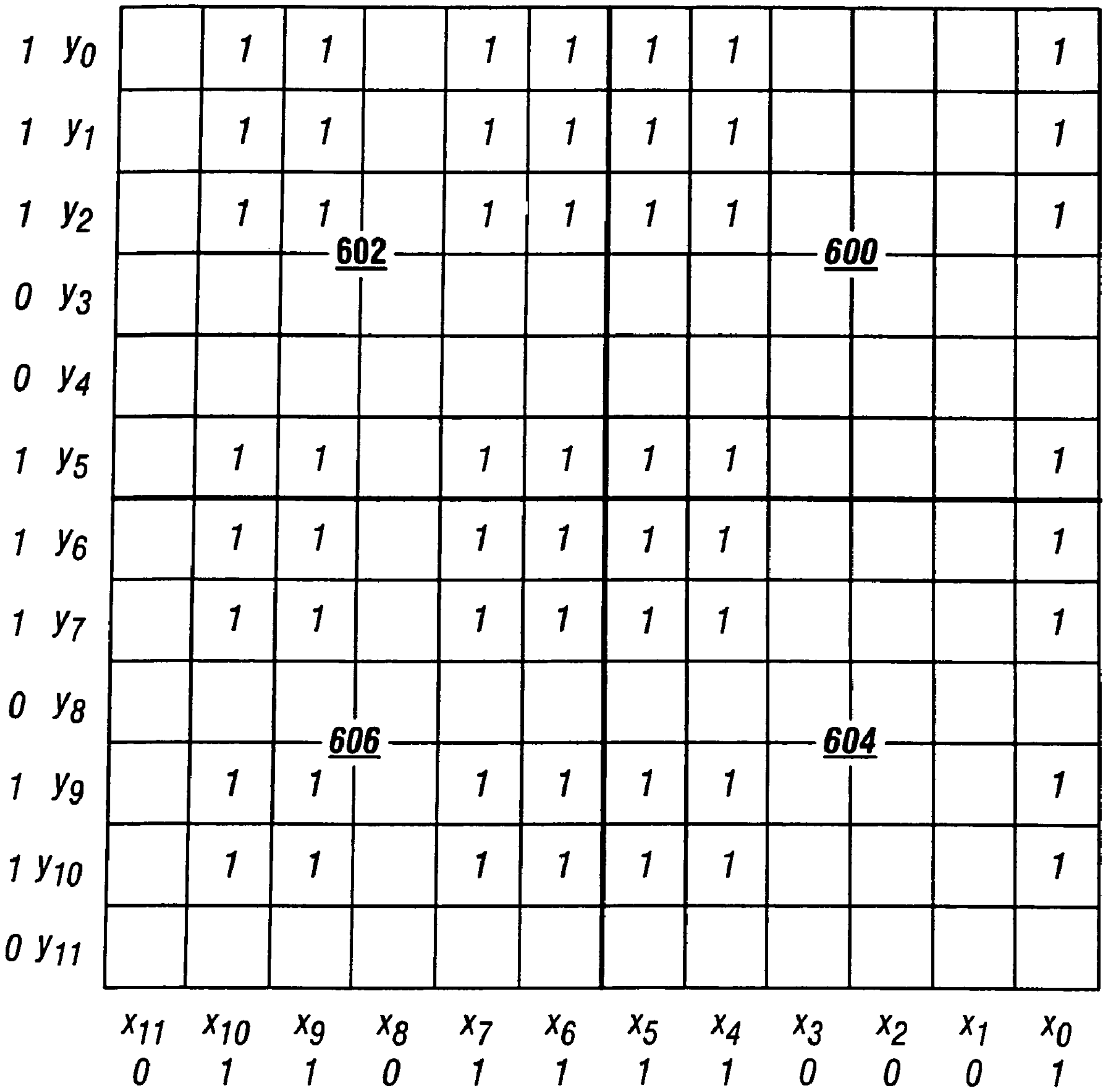
FIGS. 6*a* and 6*b* illustrate an embodiment in which the multiplication can be divided and assigned to multiple different processors.

Another embodiment describes how a larger multiplication can be assigned to multiple separate processing implementers, each of which evaluates a smaller part of the multiplication. For example, the processing implementers may be separate processors, separate processor cores, separate threads within a multithreaded system, or separate processes within any kind of pipelined or parallel system. An embodiment is illustrated in FIG. 6A, of multiplying the value 011011110001 by 011011100111.

In the embodiment, the values are assigned to the x and y axes of a rectangular memory block as in the FIG. 2A/2B embodiment. The intersection between bits of value 1 forms blocks of 1's in the product. FIG. 6A shows nine contiguous blocks of 1's.

Figure 6B:
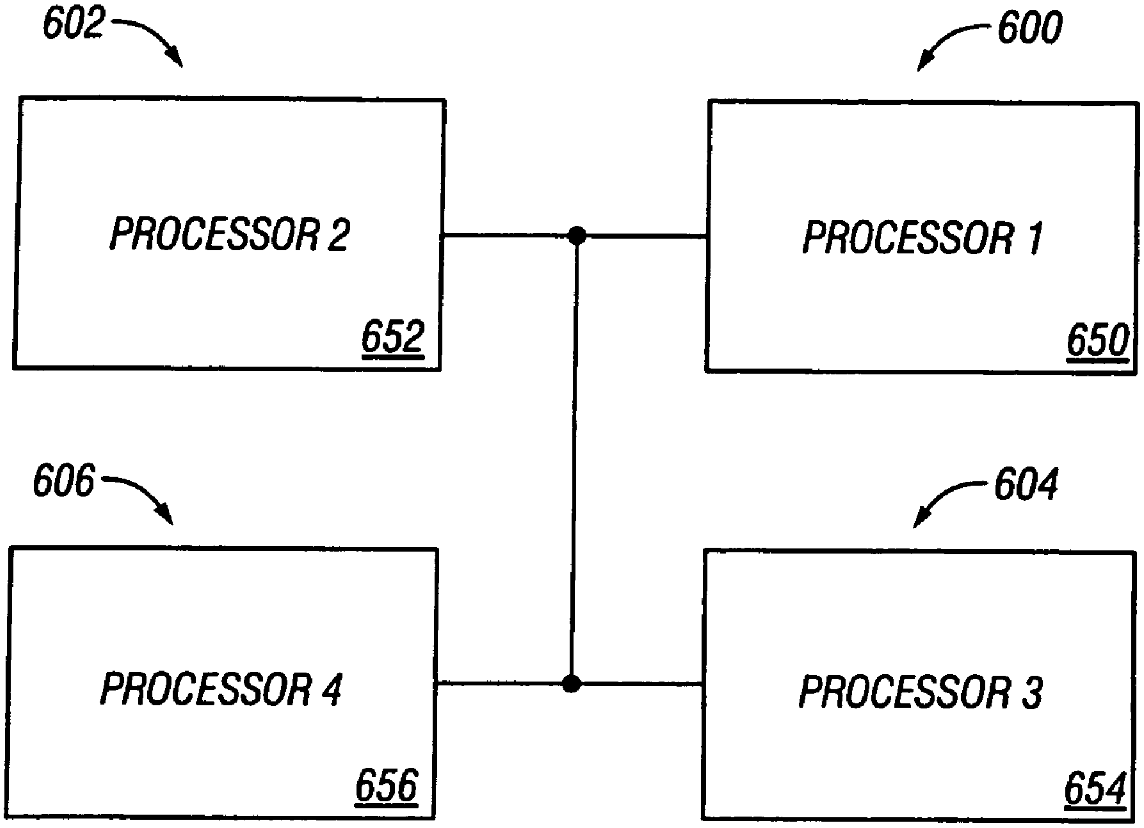
Figure 9B:
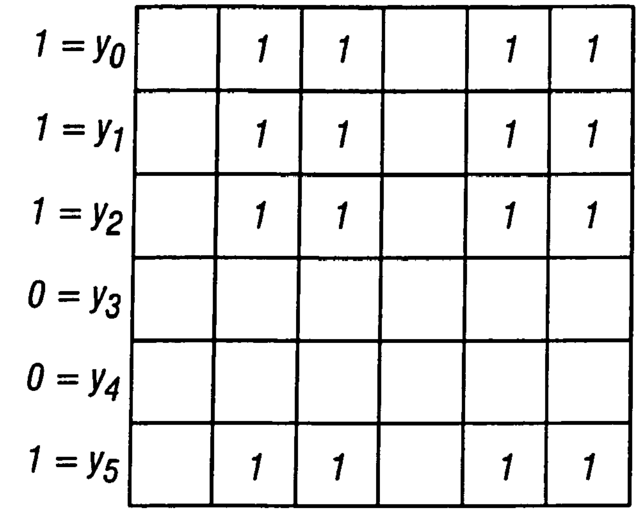
FIGS. 9*a*-9*d* illustrate dividing the multiplying into different blocks.
Figure 9A:
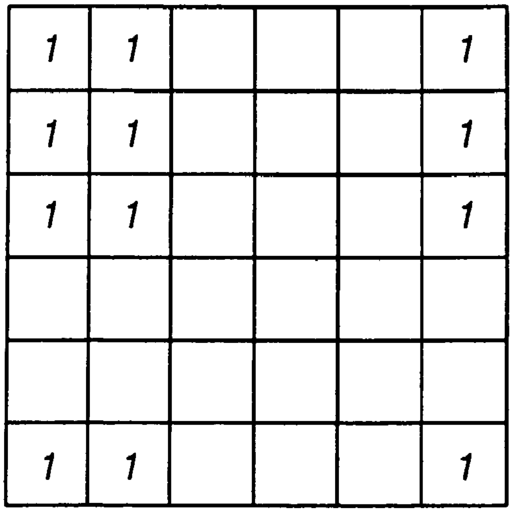
Figure 9D:
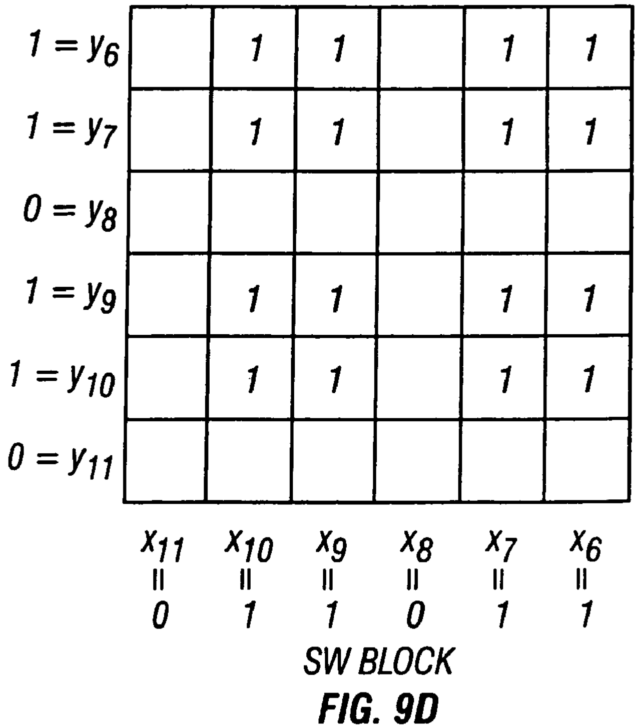
Figure 9C:
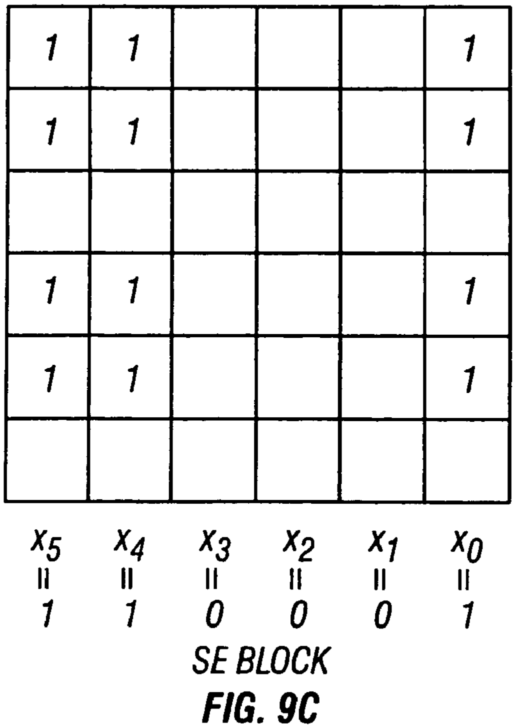

In the embodiment, the calculation is divided into multiple processing implementers. FIG. 6A shows the memory table divided into four quadrants, 600, 602, 604 and 606. FIG. 6B shows each of the quadrants being handled by a separate processor. Processor 650 handles the calculation of bits in quadrant 600, processor 652 handles the calculation of bits in the quadrant 602, processor 654 handles the processing of the bits in the quadrant 604, and processor 656 handles the processing of bits in the quadrant 606. Each processor accumulates partial results, and those partial results may be added up by yet another processor, or by one of the processors 1-4.

In an embodiment where the processing implementers are separate processors, the tasks are partitioned into 4 processors. Processor 1 (650) computes $$(y_5, y_4, y_3, y_2, y_1, y_0)*(x_5, x_4, x_3, x_2, x_1, x_0)=(100111)*(110001)$$

referred to as the NE block processor 2 (652) computes $$(y_5, y_4, y_3, y_2, y_1, y_0)*(x_{11}, x_{10}, x_9, x_8, x_7, x_6)=(100111)*(011011)$$

referred to as NW block

Processor 3 (654) computes $$(y_{11}, y_{10}, y_9, y_8, y_7, y_6)*(x_5, x_4, x_3, x_2, x_1, x_0)=(011011)*(110001)$$

Referred to as the SE block processor 4 (656) computes $$(y_{11}, y_{10}, y_9, y_8, y_7, y_6)*(x_{11}, x_{10}, x_9, x_8, x_7, x_6)=(011011)*(011011)$$

referred to as the SW block.

FIGS. 9A-9D respectively show the separated Northeast, Northwest, Southeast and Southwest blocks. Each block is separately evaluated by a separate processor.

FIGS. 10A and 10B illustrate how the blocks of 1's can be separately evaluated. The values of the 1's within the block are evaluated according to the weighting factors shown in FIG. 10A and summed. The product value of the Northeast block is thus

TABLE 5

$$\left.\begin{array}{r} 2^5+2^4+0+\ldots+2^0+ \\ 2^6+2^5+0+\ldots+2^1+ \\ 2^7+2^6+0+\ldots+2^2+ \\ 0+\ldots+2^{10}+2^9+0+\ldots+2^5 \end{array}\right\} = (1911)_{10}$$

Figure 7:
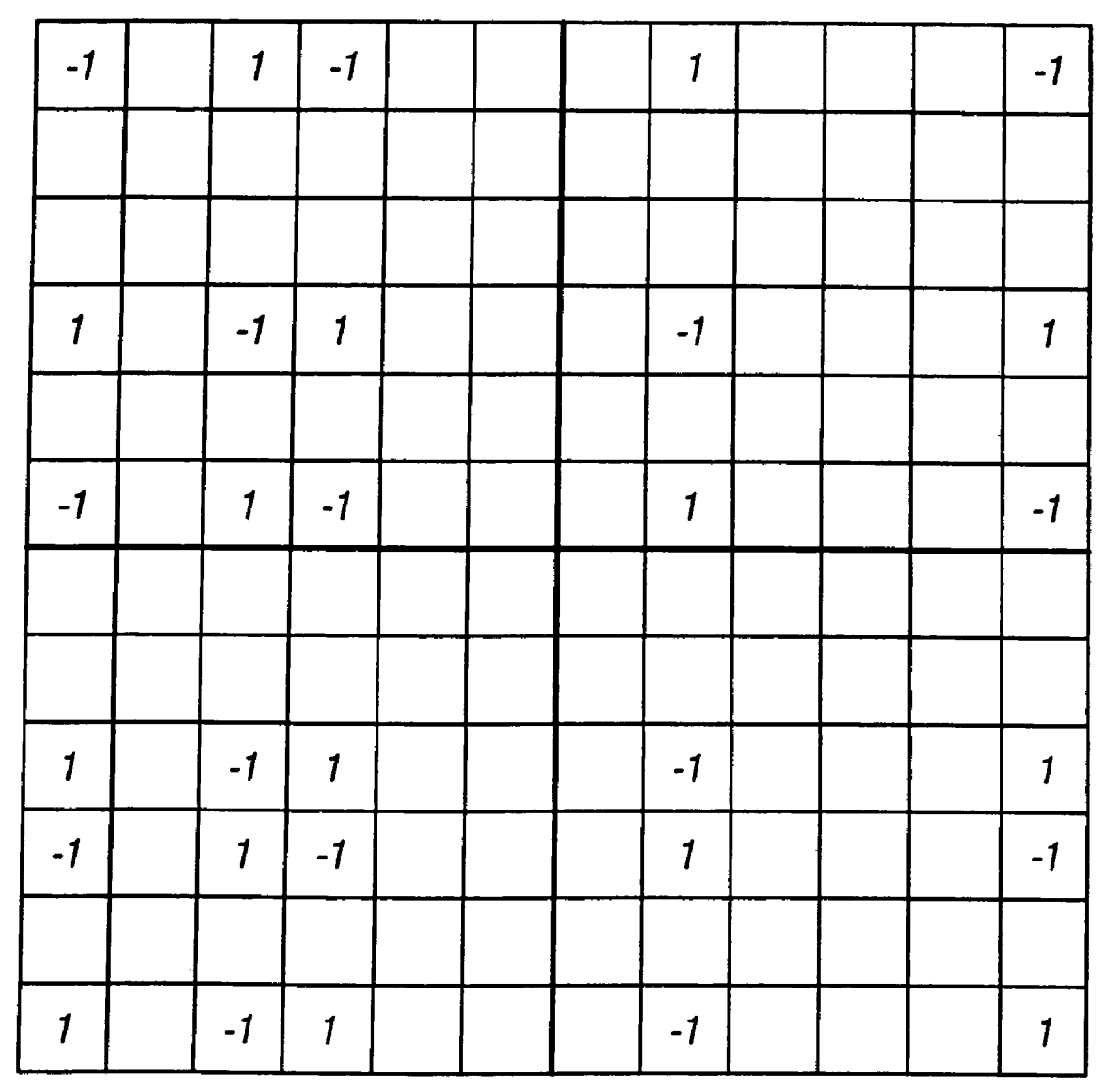
Figure 11A:
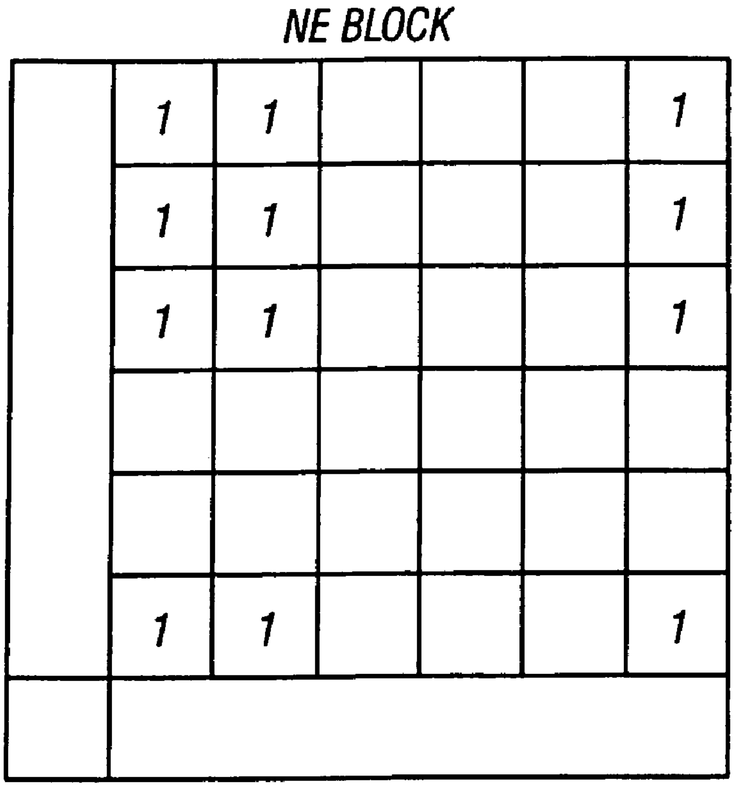
FIGS. 11*a*-11*c* show the reduced symbol technique.
Figure 11B:
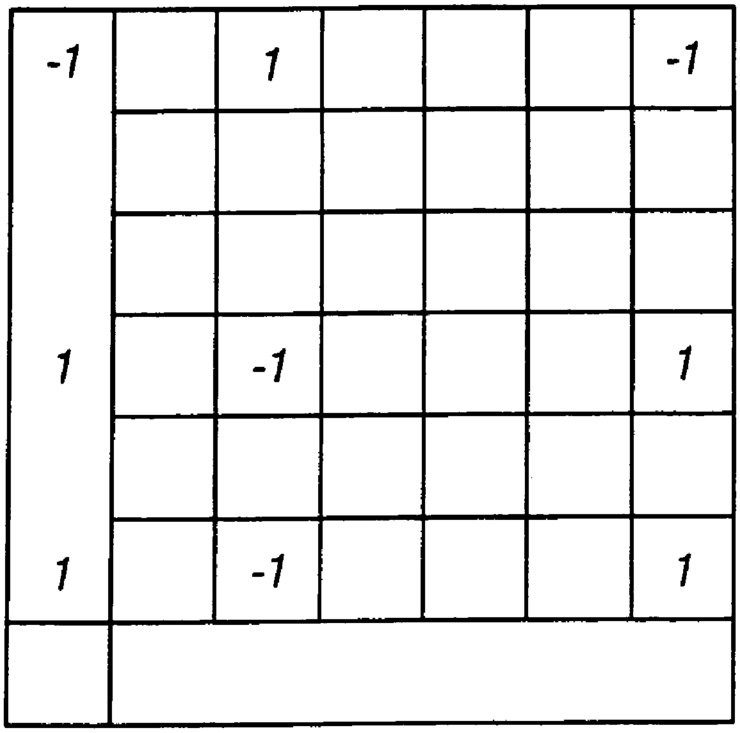
Figures 11C, 12:
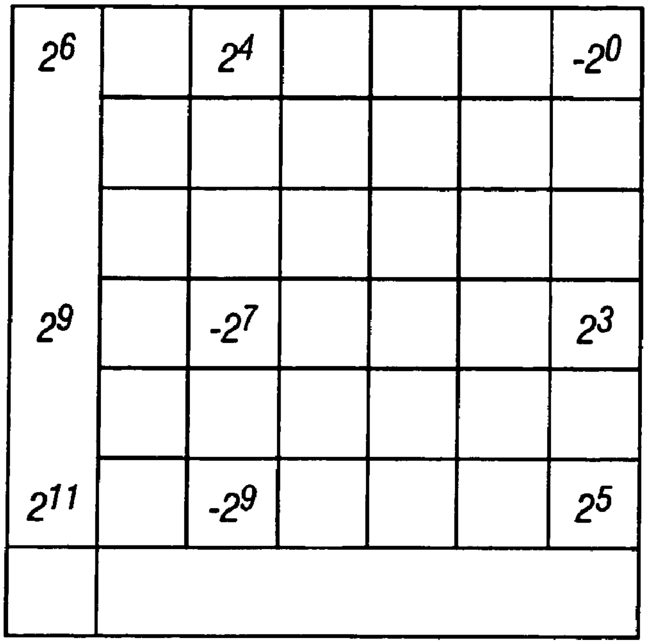
FIG. 12 illustrates finding transitions in the multiplied values between 1's and 0's.

Alternatively, each or any of the blocks can be evaluated using the four symbol rule. FIG. 7 shows the FIG. 6 block converted to 4S representation. FIG. 11A shows the northeast block, and FIG. 11B shows how that northeast block can be converted using the four symbol rule into nine symbols. Those nine symbols are evaluated as shown in FIG. 11C, which evaluates to

TABLE 6

$$\left.\begin{array}{r} -2^6+2^4+0\ldots-2^0 \\ 2^9-2^7+0+\ldots+2^3 \\ 2^{11}-2^9+0+\ldots+2^5 \end{array}\right\} = (1911)_{10}$$

The remaining blocks are analogously evaluated.

In an embodiment, each evaluated block is evaluated first with $2^0$ weighting, that is, as though it was the NE block. After evaluating the results of the partial multiplication, each evaluated block is then weighted according to its actual position. For example, the Northwest block (block 602, figure 9B) is evaluated as a 6×6 block. The value of all the "1" bits evaluate to 1053. However, this represents the unadjusted value: that is, the value of the block if it were the Northeast block. In fact, the upper right corner of the block is weighted by $2^6=64$. The evaluation is then weighted by the actual value of the lowest significant bit value. Therefore, when weighted by $2^0$, the block in figure 9B contributes 1053. However, the real contribution for the block is 1053*(64)=67392. Analogously, the Southeast block in FIG. 9C contributes 1323*(64)=84672, and the Southwest block contributes $(729)_{10}*2^{12}=2985984$.

Adding the contributions gives $$1911+67392+84672+2985984=3{,}139{,}959.$$

While the above has described processing on four different processors, it should be understood that the processing can be divided into any number of processors, and specifically divided into two, three, four, five, six, seven, eight or more processors. It may be particularly desirable to divide the processing into a number of processors that is a power of two, such as two, four, eight or 16.

These blocks of 1's can be handled as is, or replaced by the 4S simplification described above. If replaced by the 4S simplification, then six of the blocks representing the two-dimensional blocks are replaced by symbols, leaving 24 symbols. Three of the blocks are one-dimensional and are replaced by two symbols leading six symbols. FIG. 7 shows how these symbols replace the blocks of one bits. For completeness, FIG. 8 shows the weighting of these symbols, with the calculation of the final value as:

TABLE 4

$$\left.\begin{array}{c} -2^{11}+2^{9}-2^{8}+2^{4}-2^{0} \\ 2^{14}-2^{12}+2^{11}-2^{7}+2^{3} \\ -2^{16}+2^{14}-2^{13}+2^{9}-2^{5} \\ 2^{19}-2^{17}+2^{16}-2^{12}+2^{8} \\ -2^{20}+2^{18}-2^{17}+2^{13}-2^{9} \\ 2^{22}-2^{20}+2^{19}-2^{15}+2^{10} \end{array}\right\}(3139959)_{10}$$

Fifth Embodiment

The above embodiments have described multiplying two numbers using a table configuration. This fifth embodiment can be used with any of the embodiments described above or any embodiments described within this application for obtaining the information directly from the X sequence and the Y sequence.

Note also that the 0s appear in the product array in a very predictable fashion. The cells of 0s are identified and used for further simplification in an embodiment.

In this embodiment, each of the binary sequences to be multiplied is read to determine consecutive intervals of 1's and/or 0's. An embodiment describes reading the bits three at a time, with each group of three bits having one bit that overlaps the last bit of the previous group. For example, consider the sequence:

Y=011 010 100 111.

This sequence is analyzed to determine that there are four consecutive sequences of 1's, the first sequence of length 2, the second and third sequence, each of length 1, and the fourth sequence of length 3. This analysis indicates that the heights of the blocks are 2, 1, 1, 3, independent of the X sequence.

FIG. 12 shows a table of the positions of bits being read at the different times. At times 1, bits $y_{11}$, $y_{10}$, $y_9$ are read. Each occurrence of "01" indicates that a row of 1's is starting. Hence at time 1, a one block is signaled is starting at position $y_{10}$. Each occurrence of "10" indicates that a run of 1's is ending. Therefore, the marks of start and end of 1's can be automatically determined.

This determination can also be done by a divided technique, for example when assigned to four or some different number of processors. If four processors are used, each read a sequence of N/4 bits.

The sizes of the x and y extents of the blocks of 1's are determined, and used to convert to continuous blocks of 1's. Optionally, the four symbol rule can be used to convert each block of 1's to four symbols as above.

Sixth Embodiment

An additional embodiment may avoid the storage of −1 symbols, using a rule to define values of different symbols based on their positions. For any block of m, n where both are greater than two, then the symbols with the largest and smallest weighting factors are +1, and the two intermediate signs are −1. For any block where m=1 or n=1, and the other is greater than or equal to two, then the two symbols are +1 and −1 with the +1 having the larger weighting factor. For a 1×1 block, the single symbol is +1. This rule defines which of the symbols are 1s and which are −1s, and hence can be used to avoid storing −1's. This rule can easily be computer implemented.

Note that these representations need not be mathematical representations of the entire array, but can be any information indicative of that array. That information can be data in memory in any form. The techniques described herein can be carried out in software or hardware.

A hardware gate can alternately be used which produces an output of 1 when both the inputs are 1, to define the overlap between the 1's. The analogous reverse of this can alternatively be used, where the gate produces an output of zero when either of the inputs is zero.

As one speed increasing mechanism, the sequences of x and y can be read alternately until either $y_j$ or $x_i$ becomes zero.

Figure 13:
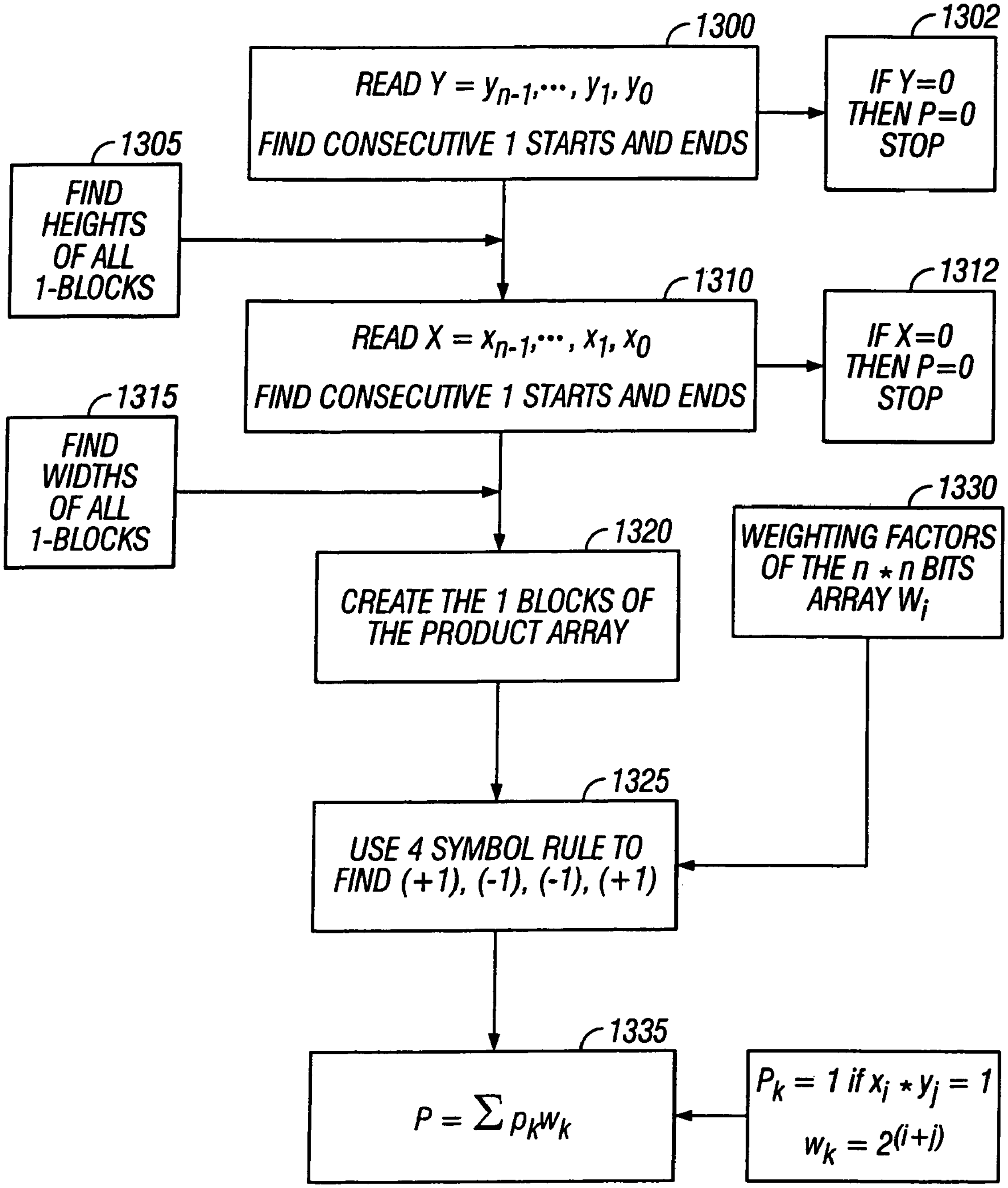
FIG. 13 shows how this can be carried out on a program computer.

FIG. 13 shows a more detailed flowchart, having additional implementation details. At 1300, the multiplier y is analyzed to determine information about the runs of consecutive 1s. 1305 illustrates how this is used to define the heights of all the 1 blocks. This is done by finding where the consecutive 1's in the y sequence start. For example, of if $y_{j-1}=0$, and $y_j=1$, then this is the start of a 1 block. When $y_{j-1}=1$, and $y_j=0$, then this represents an end of a 1 block. Using the illustration in FIG. 5, $y_{10}=0$; $y_9=0$; $y_8=1$; $y_7=1$; $y_6=0$; $y_5=0$; $y_4=y_3y_2=y_1=1$; and $y_0=0$, where ($y_9=0$, $y_8=1$) and ($y_7=1$; $y_6=0$) correspond to a starting and ending interval of 1's in FIG. 5.

At this point, the starting positions of 1s is the index of $I_8$ and the ending position of 1s is the index of $I_7$. This technique can be used to determine the heights of all 1 blocks at 1305, without reading the x sequence. Thus, all of the 1 blocks in the bottom four rows will be of height 2 in FIG. 5.

Further reading of the y sequence shows $y_5=0$ and $y_4=1$, and also shows $y_1=1$ and $y_0=0$. For this block, the starting positions is 1's is the index of $y_4$ and the ending position is the index of $y_1$. The formula used is (start-finish +1), so the height equals 4. Thus, all the one blocks in the top four rows will be of height 4.

At 1310, the X sequence is read. Analogously to the above, this is done to find the consecutive is starts and ends, in the same way as done for the Y values. This finds the widths of all the blocks at 1315. Here, $x_{10}=0$; $x_9=1$; $x_8=0$; $x_7=1$; $x_6=1$; $x_5=0$; $x_4=0$; $x_3=x_2=x_1=1$; $x_0=0$ so the marked positions are $x_{10}=0$; $x_9=1$; $x_8=0$; $x_7=1$; $x_6=1$; $x_5=0$; $x_4=0$; $x_3=x_2=x_1=1$; $x_0=0$.

Thus the width of the 1-blocks are from left to right in the top 4 rows of FIG. 5 is:

(8−8)+1(i.e. it is a single bit)

(6−5)+1 (i.e. its width is two)

(2−0)+1 (i.e. its width is three)

Therefore, the y sequence is analyzed to find heights, the x sequence is analyzed to find widths, thereby finding the information from which the table of FIG. 6A could be created.

At 1325, the "four symbol rule" may be used to find the outer symbols representing the blocks of 1s. As described above, the 4S rule allows blocks of any size, that is arbitrary n and arbitrary m, to have its value represented by four or fewer symbols, two +1s, and two −1s.

The values are accumulated at 1335, to produce the final product, P.

Seventh Embodiment

Another embodiment describes multiplication of 3 or more dimensions, e.g., 4 dimensions, 5 dimensions or more, at once. A multidimensional array like the ones described in FIGS. 2*a* and 3 is formed and used to find the three dimensional blocks of 1's, analogously to the above embodiments that find 2 dimensional blocks of is.

For a 3 dimensional block of 1's, the four symbol rule is generalized to an eight symbol rule formed as the product of three sequences, x, y and z. This enables repeated multiplications through a cubic structure as follows.

For the special case of an n-bit-length cube, let the value of product be $P^{(3)}$.

$$\begin{aligned} P^{(3)} &= (2^n-1)*(2^n-1)*(2^n-1) \\ &= (2^{3n})(+1)+(2^{2n})(-3)+(2^n)(+3)+(2^0)(-1) \end{aligned}$$

where the coefficients are $$(+1),(-3),(+3),(-1)$$

This may be important for repeated multiplications. For $p^{(4)}$, the product value is $$(1)(2^{4n})+(-4)(2^{3m})+(6)(2^{2n})+(-4)(2^n)+(1)(2^0).$$

The coefficients are the coefficients of Pascal's triangle with alternating signs.

Eighth Embodiment

Figure 14:
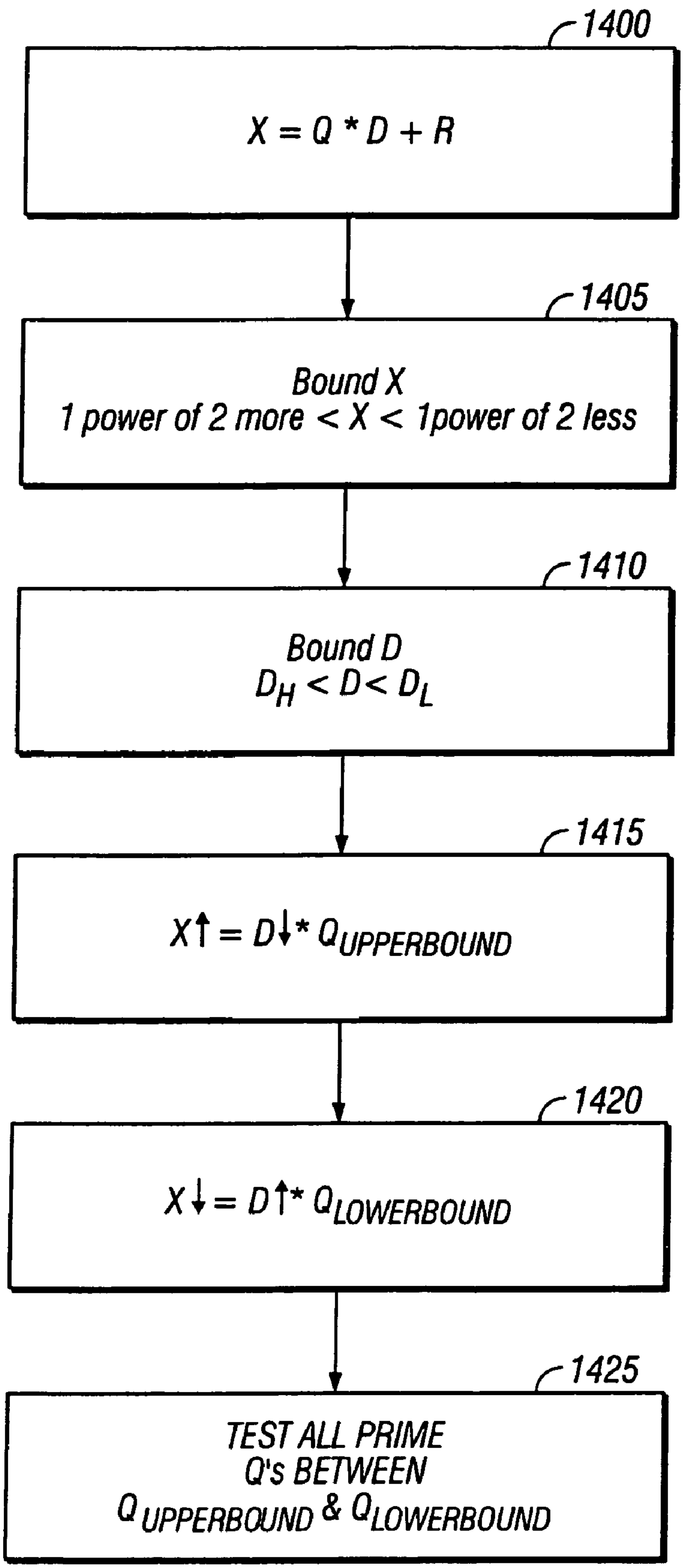
FIG. 14 flowcharts how this system can be used for division bounding.

Another embodiment describes using this technique for division. Consider a division problem as X=D*Q+R, where X is the "dividend", D is the "divisor", Q is the "quotient", and R is the "remainder". The embodiment is shown in the flowchart of FIG. 14, where 1400 shows the basic equation.

In a general division problem, X and D are known, but the problem requires calculating the quotient Q=X/D. In the embodiment, successive values of Q are used. Q may be changed until $0 \leqq R < Q$ holds. Each test, for a fixed D, is a multiplication problem, of $D*Q_1$, $D*Q_2$, etc.

Using the terminology explained above, D is treated as the multiplier, and the fixed D is used to determine the heights of all the blocks of 1's in the products $D*Q_1$; $D*Q_2$, etc.

One application of this system is for factoring a large binary sequence X into its prime factors. The binary sequence X is called the public-key, which is the product of two other large prime numbers D and Q. Both D and Q are unknown. An encryption of this type could be decoded by determining D and Q for various prime numbers until D*Q=X is found. A faster multiplying system such as that described in the first through seventh embodiments, could increase the speed of decoding. However, this could still take a very long time. The long computation time protects the intended receiver who has the secret key as well as the public-key.

In the embodiment, division, e.g., for decoding an encrypted value, is carried out by bounding the values.

The value X is assumed to have n bits and the value D is assumed to have m bits. Both are powers of 2. Therefore, Q has (n−m+l) bits. This is also a power of 2.

The value of X can be used to determine bounds for the bit lengths of D and Q. If X has a length of 1000 bits, then both D and Q are approximately between 400 bits and 600 bits in length. Again, however, trying all prime numbers between 400 bits and 600 bits would be an extremely long and tedious process. Therefore, according to the embodiment, a bound of the possible values of Q is first established. For example, if Q is between 8 and 32, then the only prime numbers necessary to test would be Q=13, 17, 19, 23, 29 and 31.

For illustration, if $X=(437)_{10}$, $D=(23)_{10}$, and $Q=(19)_{10}$.

First, X, which is known, is bounded at 1405, between a value that is one power of 2 less, and one power of 2 more, than X. Therefore, in the example, X is bounded as $256 \leqq 437 \leqq 512$. Analogously, D is bounded between 16 and 32, and Q is bounded between 8 and 32.

Expressing this in binary, $$X=(437)_{10}=(110\ 110\ 101)=(010\ 111)*(010\ 011)$$

where X has nine bits and D and Q each have six bits.

$$X-D*Q \geqq 0 \quad \text{(1) (Both X \& D are given positive images)}$$

$$\text{Let } X_1 \leqq X \leqq X_2 \quad (2)$$

$$D_1 \leqq D \leqq D_2 \quad (3)$$

This illustrates the concept—that any given binary number can be easily bounded by a binary number of length one greater than the other binary number. For example, in the example above, the binary value is bounded as (at 1405)

$$(100\ 000\ 000) \leq (110\ 110\ 101) \leq (1000\ 000\ 000)$$

Nine bits, nine bits, 10 bits

In order to use this system to calculate, the public-key is first increased and then D is increased. In the example above, the public-key is first increased to value $X_2$=1 000 000 000 according to equation 2. A value of the divisor is postulated as $16_{10}$ which is the lower estimate of the true value $23_{10}$. The quotient is postulated as Q equals $(32)_{10}$ which is an overestimate of the true value $(19)_{10}$.

This estimate is easily done because all of the numbers are powers of two. In binary:

$$1000\ 000\ 000=10\ 000*100\ 000$$

Analogously, the value of the public-key can be reduced to 100 000 000. A value of the divisor is then guessed as 32 which is an overestimate of the true value 23. This provides a quotient value of 8 which underestimates the true value 19.

Generalizing this then, after bounding at 1405 and 1410, the value of the public-key is increased to be a power of 2 which is one power of two larger than its actual value. A value of the divisor D is then postulated which is a lower estimate of the true value of D. This provides an overestimate of the true value of Q, shown in 1415 as $Q_{upperbound}$. Analogously, at 1420, the value of the public-key is decreased by a power of two, D is increased by a power of 2, to determine an overestimate of the true value of D. This provides a lower estimate of the value of Q, $Q_{lowerbound}$.

Once having the upper and lower Q estimates, all binary numbers between $Q_{upperbound}$ and $Q_{lowerbound}$ are used to find the true value. In the example above, the lower limit 8 and the upper limit 32 enables testing the prime numbers within the range, and specifically 11, 13, 17, 19, 23, 29 and 31.

This technique may be used iteratively to make larger bounds. Other techniques may be used to bound the numbers.

Many applications of this system are possible. For a public key crypto system, the basic protection is in the difficulty of factoring the product of two large prime numbers, C=x*y. However, this system can be used to narrow down the search. If the leading digit of a product is much larger than the public key C, then it is not necessary to try an even larger x and y.

Other embodiments are within this disclosure. For example, while many of these embodiments are described as software routines, they can easily be carried out in dedicated hardware. Also, the techniques described herein may be used with negative values, in addition to the described positive multiplication and division. Any size or capacity of registers may be used. While the above has described the leading digits on the left and bottom, the direction of the leading digits may be reversed. Moreover, while the division problem has been disclosed for use in bounding numbers for decryption, it can also be used for bounding division problems for other purposes, as well as for finding final values associated with divisions.

Only claims herein which use the word "means" are intended to be interpreted in accordance with 35 USC 112, sixth paragraph.

What is claimed is

1. A method of processing data in a data processing apparatus comprising:

processing data comprising at least a first binary value and a second binary value to increase speed of operations in the data processing apparatus comprising:

multiplying the first binary value by the second binary value and accumulating information indicative of areas of intersections between 1's in said first binary value and 1's in said second binary value, wherein said accumulating information comprises forming a table having areas, said areas being weighted in a way such that areas of intersection between the 1's in said table represent a partial value associated with said intersections between the 1's;

identifying blocks of 1's in said table, and wherein said evaluating comprises evaluating values of the blocks of 1's;

evaluating said information indicative of said areas of intersections to determine a value related to said multiplying, wherein said evaluating comprises reducing the blocks of 1's to a reduced representation indicative of the blocks of 1's, and wherein said reducing comprises reducing the blocks of 1's to a representation where any block of 1's of any size can be represented by four symbols or less; and using said evaluating for cryptographic evaluation.

2. A method as in claim 1, wherein said table is formed in a memory associated with a processor.

3. A method as in claim 1 wherein said reducing comprises reducing a block of 1's with m rows and n columns to a corresponding reduced value proportional to $2^{m+n}-2^{m}-2^{n}+2^{0}$.

4. A method of processing data in a data processing apparatus comprising:

processing data comprising at least a first binary value and a second binary value to increase speed of operations in the data processing apparatus comprising:

multiplying the first binary value by the second binary value and accumulating information indicative of areas of intersections between 1's in said first binary value and 1's in said second binary value, wherein said accumulating comprises forming a table having areas, said areas being weighted in a way such that areas of intersection between the 1's in said table represent a partial value associated with said intersections between the 1's;

identifying blocks of 1's in said table;

evaluating said information indicative of said areas of intersections to determine a value related to said multiplying, wherein said evaluating comprises evaluating values of the blocks of 1's, and reducing the blocks of 1's to a reduced representation indicative of the blocks of 1's, wherein said reducing comprises reducing the blocks of 1's to a representation where any block of 1's of any size can be represented by four symbols or less, and determining a block of 1's, maintaining a northeast bit of the block of 1's in a same position as a first bit, positionally encoding a southeast bit one bit south of its bit position as a (−1) value as a second bit, positionally encoding a southwest bit into a corresponding 1 bit shifted diagonally one bit south and west as a third bit, and positionally encoding a Northwest bit as a(−1) bit, one bit to the west of its position as a fourth bit, and removing all other bits from said block of 1's, other than said first bit, said second bit, said third bit, and said fourth bit; and using said evaluating said information for cryptographic evaluation.

5. A method as in claim 1, further comprising dividing said first value and said second value into multiple separated portions, and carrying out said accumulating and said evaluating of each of said separate portions, separately.

6. A method as in claim 5, further comprising carrying out said evaluating for each of said multiple separated portions on each of a plurality of separated processing implementers.

7. A method as in claim 5, wherein said carrying out said evaluating on each of said separate portions comprises evaluating intersections between each of the separate portions, and subsequently weighting values related to the intersections according to values of said separate portions.

8. A method as in claim 5, further comprising evaluating each of a plurality of separated portions on each of a plurality of separate processing implementers.

9. A method as in claim 8, wherein said evaluating each of the plurality of separated portions comprises forming a table which is weighted in a way such that intersections between the 1's represent a partial value associated with said intersections between the 1's, and accumulating partial values, to form a partial value related to said separated portions.

10. A method as in claim 9, wherein said accumulating said partial values comprises reducing said partial values to a representation where at least a plurality of two-dimensional blocks of same value bits are reduced to a reduced representation of four symbols or less.

11. A method as in claim 9, wherein said evaluating further comprises weighting said partial value according to a position of said partial bits.

12. A method as in claim 1, wherein said evaluating comprises reducing the blocks of one's to coordinates indicative of specified corners of the blocks.

13. A method as in claim 1, wherein said evaluating comprises determining a partial result.

14. A method as in claim 13, wherein said partial result comprises obtaining a more significant part of the result prior to obtaining a less significant part of the result.

15. A method as in claim 1, wherein said multiplying comprises analyzing said first and second binary values to determine locations of transitions between 0 values and 1 values, and using said locations to form said information.

16. A method as in claim 1, wherein said multiplying multiplies said first binary digit and said second binary digit by a third binary digit, and accumulating information indicative of interactions between 1's in all of said first, second and third binary digits.

17. A method as in claim 1, wherein said multiplying determines said information by finding 0's in said first or second binary values, and using areas of 0's to define said areas of intersections between 1's.

18. A method as in claim 1, further comprising, after said evaluating, using said value to bound an operation related to a division.

19. A system comprising:

a memory, having a plurality of memory locations; and a multiplier, that receives a first binary value and a second binary value and accumulates information indicative of areas of intersections between 1's in said first binary value and 1's in said second binary value in said memory and evaluates said information indicative of said areas of intersections to determine a value related to multiplying said first binary value by said second binary value, wherein said accumulating information comprises forming a table in said memory having areas, said areas being weighted in a way such that areas of intersection between the 1's in said table represent a partial value associated with said intersections between the 1's, and wherein said multiplier identifies blocks of 1's in said table and evaluates values attributable to the blocks of 1's, reduces at least one of the blocks of 1's to a reduced representation indicative of the blocks of 1's but having fewer symbols than the original block of 1's, reduces at least a plurality of the blocks of 1's to a representation where any block of 1's of any size can be represented by four symbols or less, and said multiplier comprises a plurality of separate processing implementers, each receiving only a part of data comprising said first value and said second value, and each carrying out only a portion of a total computation.

20. A system as in claim 19, wherein said multiplier includes a processor, running according to a stored program.

21. A system as in claim 19, wherein said multiplier includes hardware logic.

22. A system comprising:, a memory, having a plurality of memory locations;

a multiplier, that receives a first binary value and a second binary value and accumulates information indicative of areas of intersections between 1's in said first binary value and 1's in said second binary value in said memory and evaluates said information indicative of said areas of intersections to determine a value related to multiplying said first binary value by said second binary value;

wherein said accumulating information comprises forming a table in said memory having areas, said areas being weighted in a way such that areas of intersection between the 1's in said table represent a partial value associated with said intersections between the 1's;

wherein said multiplier identifies blocks of 1's in said table and evaluates values attributable to the blocks of 1's;

wherein said multiplier reduces at least one of the blocks of 1's to a reduced representation indicative of the blocks of 1's but having fewer symbols that than the original block of 1's;

wherein said multiplier reduces at least a plurality of the blocks of 1's to a representation where any block of 1's of any size can be represented by four symbols or less;

wherein said multiplier reduces said blocks by maintaining a northeast bit of the block of 1's in a same position as a first bit, positionally encoding a southeast bit one bit south of its bit position as a (−1) value as a second bit, positionally encoding a southwest bit into a corresponding 1 bit shifted diagonally one bit south and west as a third bit, and positionally encoding a Northwest bit as a(−1) bit, one bit to the west of its position as a fourth bit, and removing all other bits from said block of 1's, other than said first bit, said second bit, said third bit, and said fourth bit; and wherein said multiplier comprises a plurality of separate processing implementers, each receiving only a part of data comprising said first value and said second value, and each carrying out only a portion of a total computation.

23. A system as in claim 22, wherein each of said processing implementers evaluates values attributable to intersections between each of the separate portions, and subsequently weights said values according to positions of said separate portions.

24. A system as in claim 19, wherein said multiplier reduces the blocks of 1's to coordinates indicative of specified corners of the blocks.

25. A system as in claim 19, wherein said multiplier obtains a partial result attributable to a multiplication between said first binary value and said second binary value.

26. A system as in claim 25, wherein said partial result comprises obtaining a more significant part of the result prior to obtaining a less significant part of the result.

27. A system as in claim 19, further comprising an evaluating unit which analyzes said first and second binary values to determine locations of transitions between 0 values and 1 values, and uses said locations to form said information.

28. A system as in claim 19, wherein said multiplier multiplies said first binary digit and said second binary digit by a third binary digit.

29. A system as in claim 19, wherein said multiplier uses said value to bound an operation related to a division.

30. A tangible computer-readable medium containing a set of instructions for a general purpose computing part, the set of instructions to increase speed of operation comprising:

obtaining a first binary value and a second binary value;

accumulating information indicative of areas of intersections between 1's in said first binary value and 1's in said second binary value, wherein said accumulating information comprises forming a table having areas comprising using the computing part to form a table in a memory, said areas being weighted in a way such that areas of intersection between the 1's in said table represent a partial value associated with said intersections between the 1's;

identifying blocks of 1's in said table, and wherein said evaluating comprises evaluating values in a final multiplication result that are attributable to the blocks of 1's;

evaluating said information indicative of said areas of intersections to determine a value related to multiplying of said first binary value by said second binary value, wherein said evaluating comprises reducing the blocks of 1's to a reduced representation indicative of the blocks of 1's, wherein said reducing comprises reducing the blocks of 1's to a representation where any block of 1's of any size can be represented by four symbols or less; and using said evaluating for cryptographic evaluation.

31. A tangible computer-readable medium containing a set of instructions for a general purpose computing part, the set of instructions to increase speed of operation comprising:

obtaining a first binary value and a second binary value;

accumulating information indicative of areas of intersections between 1's in said first binary value and 1's in said second binary value, wherein said accumulating information comprises forming a table comprising using the computing part to form a table in a memory having areas, said areas being weighted in a way such that areas of intersection between the 1's in said table represent a partial value associated with said intersections between the 1's;

identifying blocks of 1's in said table;

evaluating said information indicative of said areas of intersections to determine a value related to multiplying of said first binary value by said second binary value, wherein said evaluating comprises evaluating values in a final multiplication result that are attributable to the blocks of 1's, and reducing the blocks of 1's to a reduced representation indicative of the blocks of 1's, wherein said reducing comprises reducing the blocks of 1's to a representation where any block of 1's of any size can be represented by four symbols or less, and determining a block of 1's, maintaining a northeast bit of the block of 1's in a same position as a first bit, positionally encoding a southeast bit one bit south of its bit position as a (−1) value as a second bit, positionally encoding a southwest bit into a corresponding 1 bit shifted diagonally one bit south and west as a third bit, and positionally encoding a Northwest bit as a(−1) bit, one bit to the west of its position as a fourth bit, and removing all other bits from said block of 1's, other than said first bit, said second bit, said third bit, and said fourth bit; and using said evaluating for cryptographic evaluation.

32. A tangible computer-readable medium as in claim 30, further comprising dividing said first value and said second value into multiple separated portions, and assigning said accumulating and said evaluating of each of said separate portions, to each of a separate processing implementer, respectively.

33. A tangible computer-readable medium as in claim 30, wherein said evaluating comprises determining a partial result.

34. A tangible computer-readable medium as in claim 33, wherein said partial result comprises obtaining a more significant part of the result prior to obtaining a less significant part of the result.

35. A tangible computer-readable medium as in claim 30, further comprising, after said evaluating, using said value to bound an operation related to a division.

36. A tangible computer-readable medium as in claim 35, further comprising, using said evaluating for cryptographic evaluation.

37. A method of processing data in a data processing apparatus, comprising:

processing data comprising at least a first value and a second value to increase speed of operations in the data processing apparatus comprising:

analyzing the first value and the second value to obtain an interim value with at least one two-dimensional block representing same value bits therein;

reducing at least one of said two-dimensional blocks to a reduced representation which includes four symbols that represent the value attributable to said one two-dimensional block;

evaluating said reduced representation to determine a result related to a multiplying of said first value by said second value;

accumulating partial results from the multiplying by finding blocks of values at intersections between 1's in the first and second numbers;

wherein said finding blocks of values comprises establishing information indicative of an intersection between the 1's in first number and the second number in a rectangular array, establishing a 1 at intersections between said 1's in the first number and 1's in the second number and evaluating each block of 1's at said intersections; and using said evaluating for cryptographic evaluation.

38. A method as in claim 37, wherein said result relating to said multiplying comprises a multiplication result of said first value by said second value.

39. A method as in claim 37, wherein said result related to said multiplying comprises a partial multiplication result of said first value by said second value.

40. A method as in claim 37, wherein said result related to said multiplying comprises a partial multiplication result indicative of certain more significant bits only, of a product of said first value multiplied by said second value.

41. A method of processing data in a data processing apparatus, comprising:

processing data comprising at least a first number and a second number to increase speed of operations in the data processing apparatus comprising:

obtaining the first number and the second number to be multiplied;

accumulating partial results from a multiplying by finding blocks of values at intersections between 1's in the first and second numbers, and accumulating results from said blocks of values, wherein each partial result from each block of values is accumulated separately without carry over from any other block of values;

wherein said finding blocks of values comprises establishing information indicative of an intersection between the 1's in the first number and the second number in a rectangular array, establishing a 1 at intersections between said 1's in the first number and 1's in the second number and evaluating each block of 1's at said intersections; and using said evaluating for cryptographic evaluation.

42. A method as in claim 41, further comprising reducing said blocks of values into a reduced representation, where said reduced representation includes fewer symbols than a number of symbols in said blocks of values.

43. A method as in claim 41, further comprising reducing each of said blocks of 1's into a reduced block of symbols.

44. A method as in claim 41, wherein said reduced block of symbols comprises four symbols for a two-dimensional block of 1's.

45. A method of processing data in a computer, comprising:

processing data comprising at least a first value having a plurality of bits and a second value having a plurality of bits to increase speed of operations in a data processing apparatus comprising:

using the computer to multiply the first value having a plurality of bits by the second value having a plurality of bits; and obtaining a portion of a solution attributable to more significant bits before obtaining another portion of the solution attributable to less significant bits, wherein said obtaining comprises finding intersections between 1's in said first value and said second value, and evaluating portions of the solution attributable to said 1's; and using said evaluating for cryptographic evaluation.

46. A method as in claim 45, wherein said obtaining comprises grouping said intersections into blocks of 1's, and evaluating each of the blocks of 1's separately.

47. A method of processing data in a computer comprising:

processing data comprising at least a first value having a plurality of bits and a second value having a plurality of bits to increase speed of operations in a computer comprising:

using the computer to multiply the first value having a plurality of bits by the second value having a plurality of bits; and obtaining a portion of a solution attributable to more significant bits before obtaining another portion of the solution attributable to less significant bits, wherein said obtaining comprises finding intersections between 1's in said first value and said second value, and evaluating portions of the solution attributable to said 1's, and grouping said intersections into blocks of 1's, and evaluating each of the blocks of 1's separately;

wherein said evaluating comprises reducing at least one of said blocks of 1's by maintaining a northeast bit of the block of 1's in a same position as a first bit, positionally encoding a southeast bit one bit south of its bit position as a (−1) value as a second bit, positionally encoding a southwest bit into a corresponding 1 bit shifted diagonally one bit south and west as a third bit, and positionally encoding a Northwest bit as a(−1) bit, one bit to the west of its position as a fourth bit, and removing all other bits from said block of 1's, other than said first bit, said second bit, said third bit, and said fourth bit; and using said evaluating for cryptographic evaluation.

48. An apparatus comprising:

multiplying means for multiplying a first value having a plurality of bits by a second value having a plurality of bits;

obtaining means for obtaining a portion of a solution attributable to more significant bits before obtaining another portion of the solution attributable to less significant bits, wherein said obtaining means comprises grouping said intersections into blocks of 1's; and evaluating means for evaluating each of the blocks of 1's separately, wherein said evaluating means comprises reducing at least one of said blocks of 1's by maintaining a northeast bit of the block of 1's in a same position as a first bit, positionally encoding a southeast bit one bit south of its bit position as a (−1) value as a second bit, positionally encoding a southwest bit into a corresponding 1 bit shifted diagonally one bit south and west as a third bit, and positionally encoding a Northwest bit as a(−1) bit, one bit to the west of its position as a fourth bit, and removing all other bits from said block of 1's, other than said first bit, said second bit, said third bit, and said fourth bit;

wherein said multiplying means comprises a plurality of separate processing implementers, each receiving only a part of data comprising said first value and said second value, and each carrying out only a portion of a total computation.

* * * * *